Figure 1:
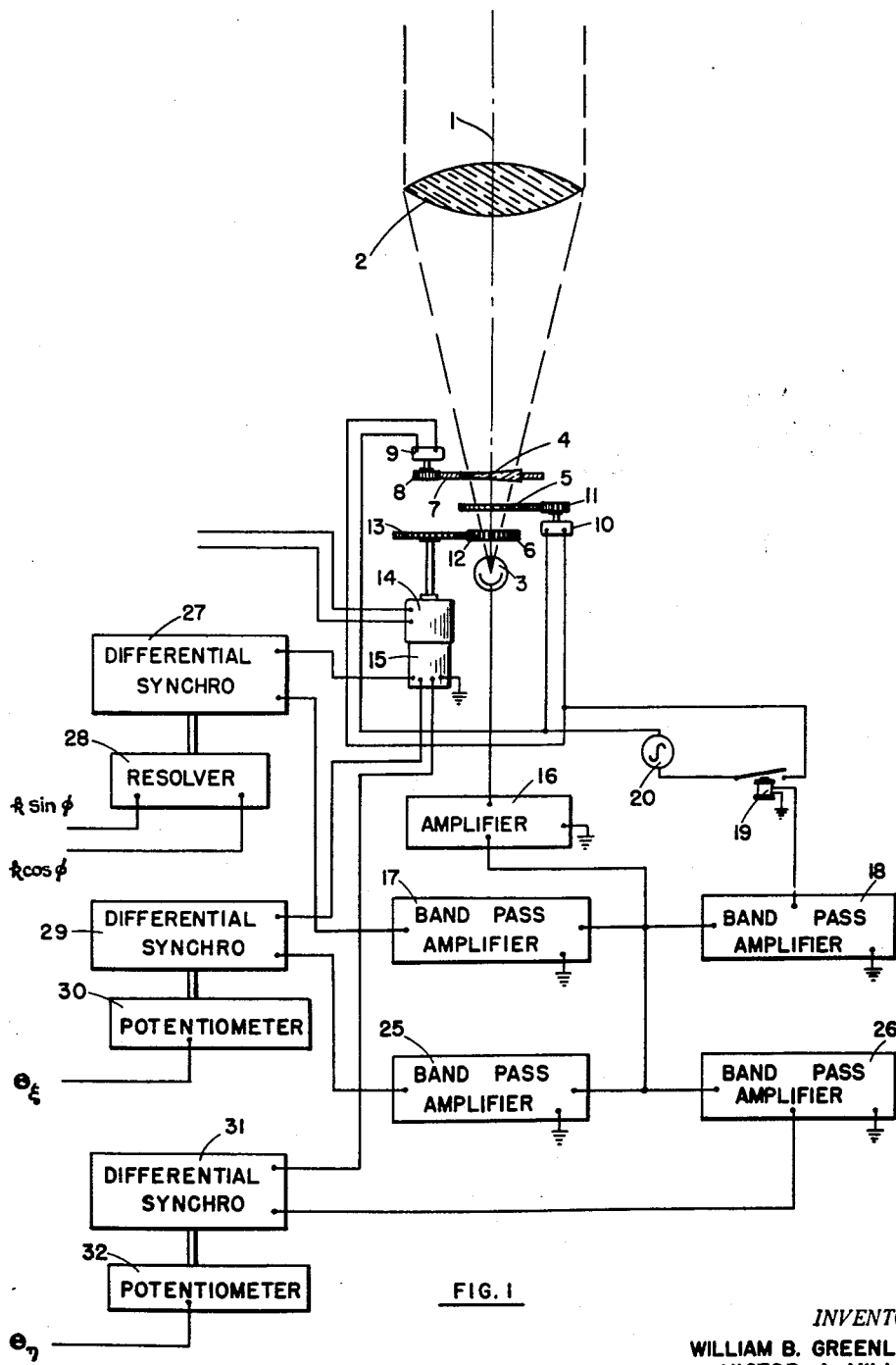

June 28, 1960  W. B. GREENLEE ET AL  2,943,204
STAR SENSING SYSTEM

Filed July 11, 1950  2 Sheets-Sheet 2

*INVENTORS*
*WILLIAM B. GREENLEE*
*VICTOR A. MILLER*
BY
*William R. Lane*
ATTORNEY United States Patent Office 2,943,204
Patented June 28, 1960

2,943,204
STAR SENSING SYSTEM

William B. Greenlee, Downey, and Victor A. Miller, Long Beach, Calif., assignors to North American Aviation, Inc.

Filed July 11, 1950, Ser. No. 173,146

25 Claims. (Cl. 250—203)

This invention pertains to the detection of the deviation of the line of sight to a star from an arbitrary known line, and it pertains particularly to an optical system adapted to yield an electrical signal indicative of the angular relation between the optical axis of a telescope and the line of sight to a particular star.

The operation of unmanned aircraft requires that some system be devised for navigating aircraft by automatic means. Two methods are generally considered feasible; namely, some system based upon information derived from the varying altitude of various celestial bodies, and the inertial system. This invention concerns itself with the former method, and particularly with the problem of detecting accurately by automatic means the angular coordinates of a star.

One of the requirements which must be met if a successful star sensing system is to be designed is that it must be capable of detecting and obtaining a fix upon stars during daylight. In daylight there is considerable sky light from which a star image must be discriminated.

In order to obtain a navigational fix based upon the altitude angle to stars at least two stars must be employed. In addition, since unmanned aircraft now might conceivably have rangers of the order of several thousand miles, provision must be made for the use of even more stars in order that suitable stars in sufficient number may be available along the entire flight path of the aircraft. To employ a fairly large number of stars requires that the star sensing system be capable of responding to the light from very faint stars since there are generally not enough first-magnitude stars available. Electronically speaking, this means that the ratio of signal to noise must be fairly high. Since the device is airborne it must be rugged, simple and light, both mechanically and electronically because of the necessity for weight saving in aircraft, and because relatively high accelerations and a variety of temperature and pressure conditions are encountered in aircraft, especially at high altitude.

Finally, a satisfactory star sensing system must be capable of generating accurate error signals despite the fact that the optical axis and the line of sight to the stare are approximately coincident. In other words, the device must be free of blind spots and there must be no orientation at which there is no signal produced.

This invention contemplates a star sensing scheme and apparatus which meets the various difficulties mentioned and satisfies the conditions set forth above.

It is an object of this invention to provide a star sensing system having a high signal-to-noise ratio.

It is a further object of this invention to provide a star sensing system having high sensitivity when the line of sight to a star is substantially coincident with the optical axis of the system.

It is a further object of this invention to provide a star sensing system employing a rotating reticle.

It is a further object of this invention to provide a star sensing system having an output in electrical form.

It is another object of this invention to provide a star sensing system which substantially eliminates the effect of sky light.

It is a further object of this invention to provide a star sensing system adapted to detect and sense the orientation of faint stars.

Figure 2:
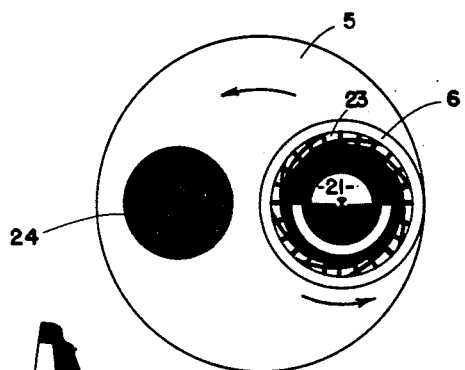
Figure 3:
Figure 4:
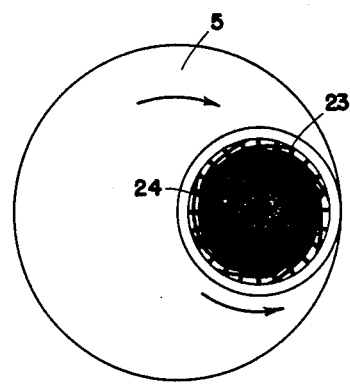
Figure 5:
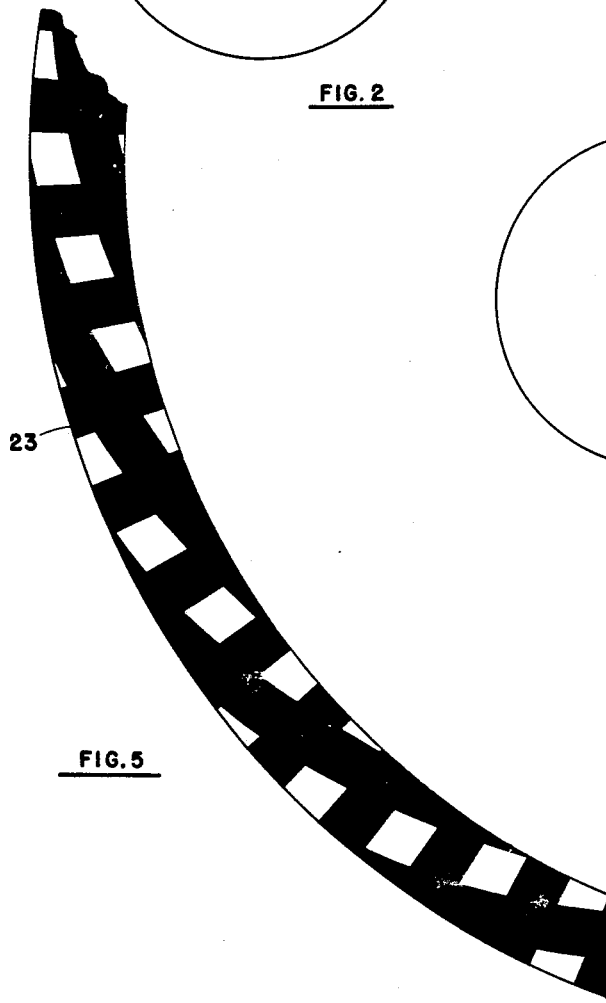

Other objects of invention will become apparent from the following description taken in connection with the accompanying drawings, in which:

Fig. 1 is a schematic block diagram of the invention;
Fig. 2 is a plan view of a reticle of this invention;
Fig. 3 is a detailed view of a part of a reticle of this invention;
Fig. 4 is a plan view of the device shown in Fig. 2 rotated through 180 degrees;
And Fig. 5 is a detail of a part of the device shown in Figs. 2 and 3.

Referring now to the drawings, and particularly to Fig. 1, there is shown a telescope optical axis 1 with objective lens 2 focusing light from a star upon a photoelectric cell 3 through a deviation prism 4, a secondary reticle stop 5 and a reticle 6. Deviation prism 4 may be rotated out of the light flux by means of gears 7 and 8 and rotary solenoid 9; and secondary reticle stop 5 may be rotated through 180 degrees by means of rotary solenoid 10 and gear 11. Reticle 6 is rotated about the optical axis 1 by a peripheral gear 12, a gear 13 and a motor 14 which also drives reference generator 15. Signals from photoelectric cell 3 are amplified in amplifier 16 and pass to or through band pass amplifiers 17 and 18. Band pass amplifiers 17 and 18 are so arranged that band pass amplifier 18 will pass a frequency double the frequency which will be passed by band pass amplifier 17. Relay 19 is connected to the output of band pass amplifier 18 and connects alternating current source 20 to rotary solenoids 9 and 10 when a double frequency signal is passed by band pass amplifier 18. The output of amplifier 16 is also connected to band pass amplifier 25 and to band pass amplifier 26, the purposes of which will become apparent thereafter. Figs. 2, 3, 4 and 5 show in detail the reticle system as it looks from the point of view of a star gazing down the optical axis.

In operation, the telescope picks up light from a star and from the sky which is included within the field of view of the telescope. This light passes to photoelectric cell 3. On its way there, however, it is intercepted by rotating reticle 6. From Fig. 2 it will be observed that reticle 6 is so constituted that the centroid of all the transparent areas thereof falls on the axis of rotation of the reticle. Normal sky background light is composed of a constant intensity, plus a linear change in intensity across the field of view, plus higher order terms. At all places in the sky, except very close to the sun, the higher order terms of skylight intensity are negligible. Thus, the received sky light intensity over a typical field of view of the device of this invention is expressed by $$E = E_0 + E_1 X + E_2 Y + \ldots$$

where higher order terms are neglected. $E_0$ is a constant intensity, $E_1$ and $E_2$ are either positive or negative, and $X$ and $Y$ are coordinates measured from the center of the field of view of this device. The device of this invention eliminates both the constant and first order terms of received light intensity from its output signal. Thus, if no star is within the field of view of the telescope a constant amplitude signal will be generated by photoelectric cell 3. However, assuming that a star image falls within area 21 of reticle 6 it can be seen that an alternating current signal will be generated by photoelectric cell 3 over and above any constant signal due to sky light. This alternating current signal will have a frequency equal to the rotational velocity of the reticle, and since reference generator 15 is driven synchronously with the reticle, it generates a signal which is of exactly the same frequency as that generated by photoelectric cell 3. However, depending upon the angular position of the star image, the signal generated by photoelectric cell 3 will be more or less out of phase with the signal generated by reference generator 15. The amount by which these two signals are out of phase indicates the direction in which the line of sight to the star deviates from optical axis 1. Consequently a phase comparison of the output of band pass amplifier 17 and the output of reference generator 15 affords sufficient information to commence correcting the angular orientation of the telescope so as to follow the star. As this correction proceeds, the image of the star comes closer and closer to the axis of rotation of reticle 6. When the image comes within area 22 (shown in detail in Fig. 3), the signal generated by photoelectric cell 3 immediately doubles in frequency, since there are now twice as many transparent and opaque portions of the reticle chopping the starlight flux for each revolution of the reticle. Band pass amplifier 18 is tuned rather narrowly only to twice the frequency generated by reference generator 15, and when this frequency appears in the output of amplifier 16, band pass amplifier 18 passes current to relay 19, thus connecting current from alternating current source 20 to rotary solenoids 9 and 10. When the star image reaches area 22 of the reticle it is observed that the line of sight to the star is very close to coincidence with the optical axis of the telescope. To eliminate anomalous error signals and oscillations about this correct orientation, deviation prism 4 actuated by rotary solenoid 9 is now brought into the optical system and the image of the star is projected upon peripheral portion 23 of reticle 6. Simultaneously, rotary solenoid 10 is energized and secondary reticle stop 5 is rotated so that its opaque portion 24 blocks out all the central portion of reticle 6, leaving exposed only peripheral portion 23, a part of which is shown in much greater detail in Fig. 5. In Fig. 5 it can be seen that area 23 of reticle 6 consists of uniformly spaced radially directed strips superimposed over uniformly spaced spiral strips. The radial pattern has a substantially uniform radial density, while the spiral pattern has a substantially uniform circumferential density. Again the centroid of all the transparent areas of portion 23 of the reticle is seen to be at the axis of rotation of the reticle so that, again, the effect of sky light is substantially eliminated. When the star image falls on area 23 the resultant photoelectric cell signal is chopped with two distinguishable frequencies. One frequency corresponds to the number of radial strips previously referred to, while the other frequency corresponds to the number of spiral strips. The number of spiral strips, it can be seen, is much smaller than the number of radial strips. Therefore, the frequency of the photoelectric cell signal due to the radial strips is much greater than the frequency of the signal due to the spiral strips. These signals are used to determine where the star image is in peripheral portion 23 circumferentially and radially, respectively. Actually, of course, a complex wave is produced by the photoelectric cell, the two components of which are of the above origins. It is desirable that the number of spiral strips in a given space bear an odd number ratio to the number of radial strips in the same space so that no interaction between the two is possible. A good ratio has been found to be 11 radial strips to 3 spiral strips, though other odd number combinations would be equally feasible. In general, any frequency ratio which when simplified is the ratio of odd numbers will give rise to only a small amount of mutual interference because no harmonic frequency of a given fundamental can equal the other frequency fundamental, and no sum or difference frequency can be equal to either of the fundamentals.

Reference generator 15 generates in all, three different frequencies which are all exactly proportional to the speed of rotation of reticle 6. All of the signals from photoelectric cell 3 are amplified in amplifier 16 and are selected by the various band pass amplifiers for the purposes required. When the star image is in peripheral portion 23, photoelectric cell 3 generates a complex wave composed of only two frequencies which correspond to the two types of strips previously referred to. The lower of these two frequencies corresponds to the spiral pattern and is selected by band pass amplifier 25. A comparison of the phase of the signal passed by band pass amplifier 25 with a signal from reference generator 15 having the same frequency indicates the distance of the star image from the optical axis in its new position in area 23. Band pass amplifier 26, on the other hand, selects only the higher frequency resultant from the radial strips of peripheral portion 23, and comparison of the phase of this signal with the phase of a signal from reference generator 15 having the same frequency indicates the circumferential position of the star image within a small field in peripheral portion 23. In other words, comparison of the output of band pass amplifier 26 with a signal from reference generator 15 indicates in what direction the line of sight to a particular star deviates from the optical axis of a telescope; whereas a comparison of the phase of the signal output of band pass amplifier 25 with a reference frequency from reference generator 15 indicates the magnitude of the deviation of the line of sight to the star from the optical axis of the telescope.

The manner in which these phase comparisons are used to keep the telescope pointed at a given star at all times is more fully explained in application Serial No. 86,424 entitled "Gyrocycloptic Platform," filed April 9, 1949 in the name of R. B. Horsfall, Jr. et al. These signals are in general used to torque gyroscopes which are mounted on a stable platform which in turn supports the telescope. Because the gyroscopes must be torqued in response to other influences besides the information gathered from sighting stars it is necessary that all sources of torques for the gyroscopes contribute to a common computer which algebraically adds all of the various effects and furnishes the gyroscopes each with a single torque. It therefore suffices if the present invention furnishes to such computer, voltages proportional to the corrections necessary to restore the telescope to alignment with a line of sight to the star. In application Serial No. 86,424 there is shown a star sensing system adapted to yield error signals in the form of $\theta\xi$ and $\theta\eta$ which are defined as error angles about axes normal to the line of sight to a star. The present invention is designed to replace the star sensing system shown in application Serial No. 86,424, and therefore is adapted to yield error signals having the same sense.

Referring to Fig. 2, and particularly to reticle 6, it can be seen that the star image falls into three successive areas and causes the invention to assume three different stages of operation.

Stage 1 occurs when the star image lies in area 21, which may be characterized as a half sector disc and a compensating semi-annulus. The inner radius from the axis of rotation of the semi-annulus is greater than the outer radius of the half-sector disc. The light from the star is chopped, yielding a square wave whose period is equal to the time for one revolution of reticle 6. The resultant photoelectric cell signal is fed through amplifier 16 and band pass amplifier 17 to differential synchro 27. Differential synchro 27 also receives an alternating signal from generator 15. This signal from generator 15 is required to have the same frequency as that produced by the chopping action of the half sector disc. As previously explained, the signal received from photoelectric cell 3, however, will be more or less out of phase with the signal received by differential synchro 27 from generator 15. Rotation of differential synchro 27 will then occur in an amount proportional to the phase difference between the signal received from generator 15 and the signal received from photoelectric cell 3. This rotation is supplied to a resolver 28 with orthogonally disposed fields which yield signals which are proportional to the sine and cosine of the phase difference $\phi$ between the signal from generator 15 and photoelectric cell 3. These voltages indicate only the direction in which the orientation of the telescope axis is in error from a line of sight to the star, and do not afford sufficient information to determine the amount of such error. However, since the amount must be fairly large in order that the star image falls within area 21 of reticle 6, the gyroscopes may be torqued in the proper direction in response to these signals in the sense required to reduce the size of the output of resolver 28. During this initial stage in the operation of the invention these voltages may be fed directly to the computer described in application Serial No. 86,424.

The second stage is a transitory one and occurs when the star image falls within area 22 of reticle 6. When the star image falls within area 22 the frequency of the resultant photoelectric cell signal immediately doubles over what it was when the star image fell in area 21. This signal is again fed through amplifier 16; but since band pass amplifier 17 is tuned to receive only the one basic frequency corresponding to the half sector disc, no signal passes through it to differential synchro 27. Rather, a signal is passed through band pass amplifier 18, and relay 19 is operated in a manner already disclosed to shift the star image to peripheral portion 23 of reticle 6. When this happens, no further signal is passed by band pass amplifier 18 or band pass amplifier 17, and the third stage of operation of the device has begun. During this third stage, the image of the star is focused upon portion 23 of reticle 6, a part of which is shown in detail in Fig. 5. As reticle 6 continues to rotate, the light flux from the star is again chopped by the reticle, and over small limits, error signals are generated which indicate the deviation of the telescope axis from a line of sight to the star. Since these error signals are very small, and since the response time of the gyroscopes is finite, it is important that there be no condition while the image of the star is focused in portion 23, under which no signal is generated. The pattern shown in portion 23 satisfies this condition admirably, as can be observed from Fig. 5, because a chopped signal is furnished no matter where the star image falls in portion 23. In this stage, too, it is important to know not only the direction in which the orientation of the telescope axis is in error, but also the exact amount thereof in order that the corrective torques necessary to attain the correct orientation of the telescope may be combined with other corrective torques in the proper proportion. This invention yields quantitative information in the following manner: As hereinbefore disclosed, generator 15 yields three different alternating frequencies. The first frequency which has already been discussed, is fed to differential synchro 27. The second frequency corresponds to a spiral pattern in Fig. 5 and is equal to the frequency of the photoelectric cell signal generated because of the spiral pattern. Actually, the photoelectric cell signal generated by portion 23 of reticle 6 is a complex wave having two separate components; one corresponds to the spiral pattern and the other corresponds to the radial pattern. The frequency corresponding to the spiral pattern is passed by band pass amplifier 25 to differential synchro 29 where its phase is compared with the phase of a signal having the same frequency from generator 15. This phase difference produces a rotation of differential synchro 29 which is mechanically connected to potentiometer 30 which in turn yields a voltage proportional to $\theta_\zeta$ which is then fed to the computer of application Serial No. 86,424. In a similar manner, the third and highest frequency generated by photoelectric cell 3 is passed by band pass amplifier 26 to differential synchro 31 which produces a shaft rotation proportional to the difference in phase between the signal from band pass amplifier 26 and a signal from reference generator 15 having the same frequency. Potentiometer 32 mechanically connected to differential synchro 31 then produces a voltage proportional to $\theta_\eta$ which is also transmitted thence to the computer of application Serial No. 86,424. In the final stage of the operation therefor, there are produced signals which represent the deviation of the optical axis of a telescope from the line of sight to the star—not only in direction, but also in magnitude, since $\theta_\zeta$ and $\theta_\eta$ represent actual angular coordinates of the star image in a small field in peripheral portion 23, the center of which corresponds to the line of sight to the star. Because there is no portion of peripheral portion 23 of the reticle which yields no signal, an exact quantitative measurement of deviation of the optical axis of the telescope from the line of sight to the star is fed to the torque computer at all times—an advantage not present in star sensing devices heretofore proposed.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for detecting the direction of deviation of the line of sight to a star from an optical axis whose orientation is known, comprising a photoelectric cell, an optical system for focusing light from said star on said photoelectric cell, rotating reticle means in the path of the light from said star said reticle means having transparent and opaque portions arranged so that the centroid of its transparent portions falls upon its axis of rotation, for transmitting unmodulated the constant and the constant gradient background light from the sky adjacent said star and for modulating with a constant frequency the light from said star striking said photoelectric cell, reference generator means drivably connected to said reticle for generating an alternating current voltage of frequency proportional to the angular velocity of said reticle, whereby the phase of said photoelectric cell signal differs from the phase of said reference generator signal by an amount proportional to said direction of deviation.

2. A device as recited in claim 1 in which said rotating reticle means includes a circular reticle, the peripheral portion of which is composed of sector-shaped, equal size alternately transparent and opaque strips, a small central area of which is composed of alternate transparent and opaque quadrants of a circle and the intermediate area of which is composed of an opaque half sector disc, a transparent half sector disc and a transparent semiannular strip so situated with respect to said transparent half sector disc that the centroid of the combined areas of said transparent half sector disc and said semiannular portion falls on the center of said reticle.

3. A device as recited in claim 1 in which said reticle means consists of alternate transparent and opaque portions so arranged that the centroid of all the combined transparent portions coincides with the center of said reticle.

4. Means for producing voltages proportional to the deviation of an optical axis from the line of sight to a celestial body comprising a photoelectric cell, an optical system including said optical axis for focusing light from said celestial body on said photoelectric cell, a rotating reticle including a peripheral portion consisting of superimposed alternately transparent and opaque radial sectors and alternately transparent and opaque spiral strips of equal width, a reference generator adapted to generate at least two alternating frequencies equal to the frequencies of signals generated by said photoelectric cell in response to light passing through said peripheral portion, two band pass amplifiers each adapted to pass only one of said frequencies generated by said photoelectric cell, a differential synchro connected to the output of each band pass amplifier and to each of the corresponding frequencies generated by said reference generator, and a potentiometer mechanically connected to each of said differential synchros to thereby produce voltages indicative of the magnitude and direction of the deviation of said optical axis from the line of sight to said celestial body.

5. A device as recited in claim 4 in which said rotating reticle further includes a central portion consisting of a transparent half sector disc and a transparent semi-annular ring, the combined centroids of whose areas fall on the axis of rotation of said rotating reticle; and further including means for transferring the image of said celestial body from said central portion of said reticle to said peripheral portion of said reticle when the image of said celestial body approximately coincides with the axis of rotation of said reticle.

6. Means for generating electrical signals proportional to the deviation of an optical axis from a line of sight to a celestial body comprising a photoelectric cell for generating electrical signals in response to light from a celestial body, a rotating reticle having at least three different concentric variable circumferential density patterns for modulating the light received from said celestial body, means responsive to photoelectric cell signals resultant from light from said body passing through one or more of said patterns for shifting the star image to another of said patterns, and means responsive to the signal generated by said photoelectric cell because of light from said celestial body passing through the latter of said patterns for generating an electrical signal proportional to the deviation of said optical axis from the line of sight to said celestial body.

7. In a star sensing instrument having a photoelectric cell and an optical system for gathering light from a star and casting it upon said photoelectric cell, a circular rotating reticle having a plurality of different concentric variable circumferential density patterns, the centroid of whose combined non-opaque areas coincides with the axis of rotation of said reticle.

8. A device as recited in claim 7 and further comprising optical means for shifting the image of said star from one of said patterns to another in response to electrical signals generated by said photoelectric cell.

9. A device as recited in claim 7 in which said plurality of different concentric variable circumferential density patterns includes a central pattern comprising alternately transparent and opaque quadrants; an intermediate pattern comprising a transparent half sector, an opaque half sector and a transparent semi-annulus situated so that the centroid of the combined area of said transparent half sector and said transparent semi-annulus coincides with the axis of rotation of said reticle; and a peripheral annulus comprising a pattern having substantially constant radial density but variable circumferential density superimposed on a pattern having variable radial density but substantially constant circumferential density.

10. Means for generating electrical signals indicative of the direction of deviation of an optical axis from a line of sight to a radiant energy source comprising a radiant energy detecting device for generating an electrical signal proportional to the amount of energy falling thereon, an optical system including an optical axis directable toward a radiant energy source for furnishing energy from said radiant energy source to said radiant energy detecting device, and a rotatable reticle interposed in said optical system between said radiant energy source and said radiant energy detecting device, said reticle having transparent and opaque portions, the centroid of said transparent areas being upon said optical axis for transmitting unmodulated the constant and the constant gradient background radiation from the radiant energy field adjacent said radiant energy source and for variably modulating the radiant energy from said radiant energy source in response to variations in the relative direction of a line of sight to said radiant energy source and said optical axis whereby variations in the signal generated by said cell are indicative of the direction of said optical axis from the line of sight to said radiant energy source.

11. A device as recited in claim 10 in which said rotatable reticle includes a partially translucent peripheral annulus having a pattern of substantially constant circumferential density and variable radial density superimposed on a pattern of substantially constant radial density and variable circumferential density to thereby generate a photoelectric cell signal of complex waveform, the two components of which indicate the magnitude of two orthogonal components of the deviation of said optical axis from the line of sight to said star.

12. A device as recited in claim 10 in which said rotatable reticle includes a partially translucent peripheral annulus having a pattern of substantially constant circumferential density and variable radial density superimposed on a pattern of substantially constant radial density and variable circumferential density, the transparent areas of said patterns having a centroid at the center of rotation of said reticle to thereby minimize the effect of sky light and enhance the signal-to-noise ratio of the resultant photoelectric cell signal.

13. In a star sensing instrument having a photoelectric cell and an optical system for gathering light from a star and transmitting it to said photoelectric cell, a circular rotating reticle including a peripheral pattern comprising a plurality of uniformly spaced radial transparent strips of similar width superimposed on a plurality of transparent uniformly spaced spiral strips of similar width.

14. A device as recited in claim 13 in which the number of said spiral strips bears the ratio of two odd numbers to the number of said radial strips.

15. In a star sensing instrument having a photoelectric cell and an optical system for gathering light from a star and transmitting it to said photoelectric cell, a circular rotating reticle comprising a peripheral annulus comprising a plurality of uniformly spaced transparent strips of uniform width superimposed upon a plurality of uniformly spaced spiral transparent strips of equal width, a transparent semi-annulus disposed inwardly from said peripheral annulus, a transparent half sector disposed inwardly of said semi-annulus, and two small transparent quarter sectors at the center of said reticle, said semi-annulus being so disposed with respect to said half sector that the centroid of the combined areas of said semi-annulus and said half sector falls at the center of said circular reticle whereby the effect of sky light is substantially eliminated in the signals generated by said photoelectric cell.

16. A device as recited in claim 15 in which the number of spiral strips in said peripheral annulus bears a proper fractional ratio between two odd numbers to the number of said radial strips to thereby provide as a signal output of said photoelectric cell a complex wave, the components of which indicate a deviation of the line of sight to a star from the optical axis of said optical system.

17. Means for generating electrical signals indicative of the deviation of an optical axis from a line of sight to a star comprising a photoelectric cell for generating an electrical signal in response to light falling thereon; an optical system including an optical axis directable toward a star for furnishing light from said star to said photoelectric cell; a rotating circular reticle centered on said optical axis and rotatable in a plane normal thereto, said reticle having a peripheral annulus comprising a pattern of substantially constant radial density but variable circumferential density superimposed upon a pattern of substantially constant circumferential density but variable radial density; a transparent semi-annulus inward from said peripheral annulus; a transparent half sector inward from said semi-annulus; and two small opposed transparent quarter sectors at the center of said reticle, said semi-annulus being disposed with respect to said half sectors so that the centroid of their combined areas falls at the center of said reticle; an optical wedge for displacing the image of a star from the center of said reticle to said peripheral annulus; motor means for rotating said reticle; reference generator means for generating alternating current frequencies equal to photoelectric cell frequencies produced by light passing through said half sector, said quarter sectors, and said peripheral annulus; electronic means responsive to photoelectric cell signals produced by star light passing through said transparent quarter sectors for placing said optical wedge in said optical system; and electronic means responsive to photoelectric cell signals for generating voltages proportional to the phase differences between the signals generated by said photoelectric cell and said reference generator signals to thereby produce electrical signals indicative of the deviation of said optical axis from a line of sight to a star.

18. Means for detecting the direction of angular deviation of the line of sight to a star from an optical axis whose orientation is known, comprising a photoelectric cell, an optical system for focusing light from said star on said photoelectric cell, rotating reticle means in the path of the light from said star for transmitting unmodulated the constant and the linearly variable intensity background light from the sky adjacent said star and for modulating with a constant frequency the light from said star striking said photoelectric cell, said reticle means comprising alternate transparent and opaque portions so arranged that the centroid of all the combined transparent portions coincides with the axis of said rotating reticle, reference generator means drivably connected to said reticle for generating an alternating current of frequency proportional to the angular velocity of said reticle, said reticle having a density pattern such that the phase of said photoelectric cell signal differs from the phase of said reference generator signal by an amount proportional to said angular deviation.

19. In a radiant energy sensing instrument having a radiant energy detecting device and an optical system for gathering radiation from a radiant energy source and casting it upon said radiant energy detecting device, a rotating reticle having a plurality of different variable density patterns arranged so that the centroid of the entire light flux passing therethrough when said reticle is subjected to a light field of constant intensity is on the axis of rotation of said reticle.

20. In a star sensing instrument having a photoelectric cell and an optical system for gathering light from a star and casting it upon said photoelectric cell, a rotatable reticle having a plurality of different concentric density patterns including a central pattern comprising alternately transparent and opaque quadrants; an intermediate pattern comprising a transparent half sector, an opaque half sector and a transparent semi-annulus situated so that the centroid of the combined area of said transparent half sector and said transparent semi-annulus coincides with the axis of rotation of said reticle.

21. A rotatable reticle for use in a star sensing system comprising an opaque disc having a first transparent area in the shape of a half-sector disc, and a second transparent area in the shape of a semi-annulus, the centroid of said transparent areas falling upon the axis of rotation of said reticle.

22. A rotatable reticle for use in a star sensing system comprising an opaque disc having a first transparent area in the shape of a half-sector disc having a constant outer radius about the axis of rotation of said reticle and a second transparent area in the shape of a semi-annulus, the inside radius from said axis of rotation of said semi-annulus being greater than said outside radius of said half-sector disc, the centroid of said transparent areas falling upon the axis of rotation of said reticle.

23. A rotatable reticle for use in a star sensing system comprising a first transparent area in the shape of a half-sector disc, the outer radius of said half-sector disc being constant in distance from the axis of rotation of said disc, and a second transparent area, all portions of said second transparent area being at a distance which is greater than said outer radius from said axis of rotation.

24. A reticle comprising a plane opaque disc having a first transparent area substantially defined by a sector of a circle drawn on said disc and a second transparent area substantially defined by a sector of an annulus concentric with said circle but of inside radius larger than the radius of said circle and of dimensions such that the centroid of both said transparent areas falls on the center of said circle.

25. A reticle comprising an opaque disc, a first transparent area substantially defined by a sector of a circle drawn on said disc and a second transparent area removed from the center of said circle by a distance greater than the radius of said circle and positioned so that the centroid of both transparent areas falls at the center of said circle.

References Cited in the file of this patent

UNITED STATES PATENTS

| | | |
|---|---|---|
| 1,618,757 | Hoxie | Feb. 22, 1927 |
| 1,904,124 | Cockrell | Apr. 18, 1933 |
| 1,971,191 | Lord | Aug. 21, 1934 |
| 2,513,367 | Scott | July 4, 1950 |

FOREIGN PATENTS

| | | |
|---|---|---|
| 22,746 | Netherlands | Oct. 15, 1934 |